July 15, 1930.    P. E. EDELMAN    1,770,465
ELECTRICAL CONDENSER
Filed Nov. 23, 1927
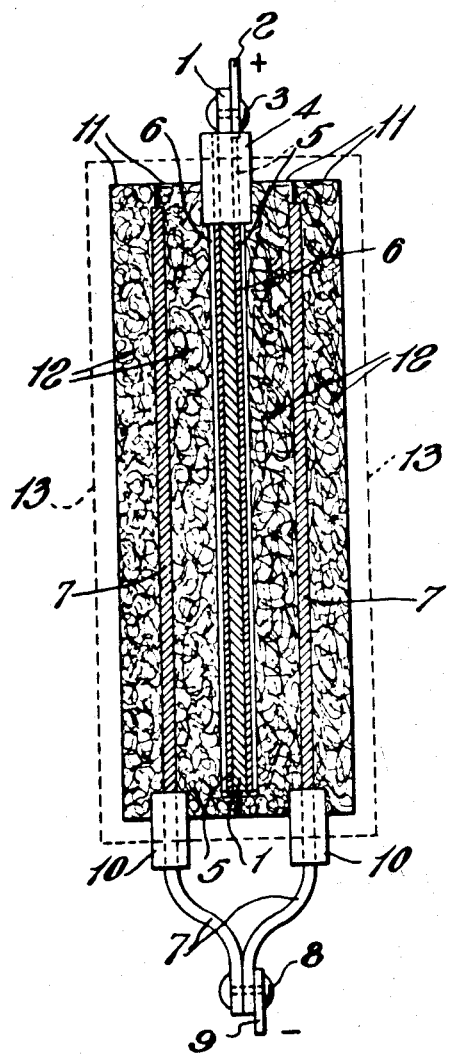
Inventor:
Philip E. Edelman.

Patented July 15, 1930

1,770,465

UNITED STATES PATENT OFFICE

PHILIP E. EDELMAN, OF CHICAGO, ILLINOIS, ASSIGNOR TO EPHRAIM BANNING, OF CHICAGO, ILLINOIS

ELECTRICAL CONDENSER

Application filed November 23, 1927. Serial No. 235,333.

My present invention relates to improvements in electrical condensers of the electrochemical type and has for its object the production of a durable condenser of high capacity in small bulk capable of withstanding operation at higher temperature than has heretofore been practicable. The improvement prevents detrimental destruction of the prepared condenser when it is subjected to temperature of the order of 125 degrees Fahrenheit such as occurs when the condenser is enclosed in a container placed near a source of heat. When wax impregnated condensers are subjected to such service conditions the wax melts or softens and permits the dielectric layer to be broken down. When wet chemical type condensers are subjected to such service, the heat causes rapid increase of leakage current and breakdown of the dielectric film. I have conceived that a condenser able to withstand operation at high temperatures can be prepared electrochemically in solid form, preparing the dielectric in cooperative stages, one of which imparts the necessary working dielectric characteristic while another having inherent qualities permitting operation at high temperatures imparts the necessary maintenance and preservation thereof.

My composition consists, for example, of two electrodes of metal such as aluminum, or other film-forming valve metal, one of which is first plated with a dielectric surface such as a thin layer of an alloy containing magnesium coated with a chemical film, which electrodes are separated by a fabric or fibrous sheet impregnated with a solidified chemical mixture capable of replenishing said chemical film and preventing destructive action on said electrodes when a high operating temperature occurs, such a chemical mixture for example as solidified sodium phosphate reinforced with acidified ammonium phosphate, ammonium dichromate and crystalline malic acid. I illustrate by way of example schematically a small condenser showing the essential relation of the parts composing my condenser, in the accompanying drawing, in which Figure 1 is a vertical section of the condenser.

The sheet of aluminum 1 which has been prepared as the positive electrode 2 has a connector 3 external to a container, 13, indicated by dotted lines. Sheet aluminum 1 has plated thereon a deposit 5 as herein set forth which is probably an alloy or compound of magnesium and electropositive to the aluminum 1. A dielectric coating 11 covers the aluminum sheet 1 and its plated deposit 5, and is prepared as herein set forth. An insulating coating 4 protects the terminal portion of aluminum sheet 1 and is applied as herein set forth. The impregnated paper or fibrous sheets 11 press against dielectric coating 6 on positive electrode 2 and also similarly contact with negative electrodes 7, 7, of sheet aluminum or nickel. Impregnated sheets 11 thus envelope the electrodes 7, 7, and 2. Electrodes 7, 7, are coated at terminal portions by insulating material such as pitch 10, 10, and brought to a negative terminal connector 9 by rivet 8. The chemical 12 used for impregnating fibrous sheets 11, 11, is a solidified mixture of chemicals applied and consisting of ingredients as set forth herein, one at least of said ingredients being selected to prevent attack of the chemical 12 on the electrodes 2 and 7 when the said electrodes are subjected to heat in service which would otherwise permit such attack. The coatings 5 and 6 on sheet aluminum 1 comprising positive electrode 2 are applied thereto prior to assembly of the said electrode with the impregnated sheets 11, 11. The chemical 12 in the impregnated sheets 11, 11, is herein designated as the operating solid. The solution designated herein as the preparing solution does not appear in the finished condenser but is only used in preparing the coatings 5 and 6 on sheet aluminum 1.

The impregnating chemical 12 in sheets 11, 11, preferably contains a metallic compound which is electronegative to aluminum, such for example as a compound of chromium or one having combined chromium such as ammonium chromate or ammonium dichromate. The chromate content of chemical 12 comprising the operating solid has the necessary preserving property of preventing attack of chemical 12 on the aluminum sheets 7, 7, 1 which would otherwise be destructive thereto when the chemical 12 is heated above normal operating temperatures, a condition which can occur when the impregnated sheets 11 are subjected to heat transferred from other heated apparatus in which the finished condenser is used.

In preparing the composition I prefer to use two chemical mixtures which I designate firstly as the preparing solution and secondly as the operating solid. The preparing solution is employed only in the manufacture of the plated electrode while the operating solid contacts with both electrodes in the prepared condenser. For the electrodes I prefer to use the best grade sheet aluminum of about 34 gage with the positive one thereof first prepared under the influence of the preparing solution as herein set forth. The negative electrode does not require the preparation given to the positive electrode and may consist of aluminum or some other metal such as nickel. The separating sheet material for said electrodes may consist of cotton gauze or cotton linter blotting paper impregnated with said operating solid. Said operating solid may for example be prepared from a hot mixture of melted sodium phosphate crystals mixed with acidified ammonium phosphate reinforced with malic acid and ammonium dichromate in about the proportions of 12 pounds of sodium phosphate, 1 pound of ammonium phosphate prepared with sufficient phosphoric acid to react approximately neutral to a chemical indicator, 10 ounces of ammonium dichromate, and 4 ounces of malic acid. Sufficient distilled water may be added thereto to make up for loss of water during the processing and can be conveniently utilized to first thoroughly dissolved the ammonium dichromate before it is added to said mixture. Good results may be had however when the ingredients of the operating solid are varied therefrom, it being desirable not to exceed approximately 1 ounce of ammonium dichromate per pound of total operating solid mixture and not to exceed 1/3 ounce per pound of total operating solid with the malic acid content. In lieu of the ammonium dichromate, ammonium chromate may be employed or chromic acid may be used in equivalent proportions as the relative strengths of such variants require. It is further permissible to omit the ammonium phosphate content and substitute therefor an additional amount of ammonium dichromate or an equal weight of magnesium monophosphate prepared with sufficient phosphoric acid to first dissolve said magnesium monophosphate. The separating sheet material can then be impregnated with said operating solid while it is maintained in a hot liquid state which rapidly solidifies upon cooling below 125 degrees Fahrenheit. To withstand higher operating temperatures it is only necessary, when desired to further reinforce the operating solid, to increase the melting point thereof, such for example as by the use of an increased proportion of acidified ammonium phosphate. The composition is then completed preferably by winding alternately sandwiched sheets of electrodes designated as positive and negative between said impregnated separating sheets. Suitable terminal strips can be formed on said electrode sheets and are preferably protected at such terminals by a coating of pitch or rubber so that the only exposed surfaces of said positive and negative electrodes contacting with said impregnated separating sheets are wholly covered by said separating sheets, forming an envelope thereabout.

I will now describe the preparation of the positive electrode and the preparing solution used therefor. For the preparing solution I prefer to use a solution made from ingredients in about the proportions of 18 pounds distilled water, 12 pounds sodium phosphate, 5 ounces magnesium monophosphate prepared in 1½ pounds phosphoric acid and ½ pound ammonium dichromate. Variations therefrom are permissible but the proportion of magnesium monophosphate used should not be reduced below the quantity indicated. The preparing solution will have a color resembling orange, whereas the operating solid will have a greenish tint resembling lime, changing to this tint from orange color when the hot mixture is completed but retaining some yellow or orange color in the operating solid. In making up the preparing solution heat may be applied to facilitate the mixture of the ingredients but the prepared solution is best used at room temperature. Each ingredient in both the preparing solution and the operating solid should preferably be added to the melted sodium phosphate base separately while the whole is stirred, to avoid undesired precipitates, and the ammonium dichromate in each instance is preferably added last.

The manner of using the preparing solution is to immerse the sheet of aluminum or other film-forming valve metal to become a positive electrode therein while containing the said solution in an aluminum box or pot which is connected to the negative terminal of a storage battery. The aluminum sheet to become the positive electrode is connected to a positive terminal of said storage battery, whereupon current flows from the aluminum sheet thru the preparing solution to the container. The voltage applied can be increased by stages to a slightly higher value than the positive electrode is to withstand subsequently in service. The aluminum sheet can be immersed in the treating solution for a period of several hours or may be continuously fed therethrough as the mixture used in the preparing solution acts rapidly to plate, firstly, a magnesium alloy or compound on the aluminum sheet and secondly to coat same with a chemical film of high dielectric value and enduring value. The coat thus applied is very homogeneous and adherent so that it does not scratch off in subsequent handling of the positive electrode. The nature of this coat applied to said aluminum sheet is different from coatings heretofore applied to aluminum in the properties set forth, namely that an alloy or compound of magnesium is first plated on the aluminum by the action of the electric current and immediately protected by the further action of said current in coating the plated surface with a chemical film rich in protective oxides in the presence of some assisting chromates. The container which is used as a temporary negative electrode is unaffected other than by a gradual deposit thereon which is visible and a conductor rather than a dielectric film, and does not affect the continued use of the container. The aluminum sheet to be used as a positive electrode can conveniently be rolled thru a bath of the preparing solution as set forth, continuously, and in order to hasten the action, a series of similar baths of preparing solution in duplicate containers may be employed, each operated at a successively higher plating voltage in similar manner.

The completed positive strip will then be available as rapidly as it can be wound into a finished condenser with the spacer sheets impregnated with the operating solid, while the cooperating negative electrode of untreated aluminum sheet is simultaneously wound and spaced therefrom by said spacer sheets. This operation is similar to that of the prior art but differs in that subsequent pouring and forming operations are unnecessary. It is desirable to coat the terminal portion of the positive and negative electrodes of each condenser with an additional dip of molten pitch at the terminal portion. This can be conveniently done by dipping the terminal portion in the pitch and promptly cooling same whereupon the pitch will adhere to the terminal strip formed from the electrode.

The condenser may thus be wound from rolled stock in a continuous operation, feeding alternate strips of positive and negative aluminum sheets between spacer sheets simultaneously impregnated with the operating solid, and all wound to form while the operating solid is still warm. This tends to make the operating solid adhere to the metal surfaces of both electrodes so that a solid condenser composition results on cooling. The impregnation of the spacer sheets can be accomplished either just before the winding operation or the winding mandril can be immersed in a molten portion thereof maintained fluid during the winding by an electric or gas heater. By this mode of preparation, very little preparing solution is used up and can easily be replenished, but the operating solid is rapidly consumed by impregnation in the spacer sheets and must be renewed with additional quantities of the molten or liquefied mixture.

The presence of the chromate content in this operating solid while it is in molten or liquid state prevents the attack of the sodium phosphate and ammonium phosphate on the aluminum sheets which would otherwise occur in detrimental amount at the high temperature required to maintain the mixture at good impregnating fluidity and subsequently this same chromate content acts similarly in the event that the finished condenser becomes overheated in service. If however excessive portions of the chromate content such as ammonium dichromate were used, the fibrous spacer strips would be attacked. Hence the necessity from such considerations points to the use of the minimum portion which performs the function stated. This can be experimentally tested by observing the attack indicated by gassing at the aluminum surfaces exposed to the hot operating solid mixture while it is maintained in fluid state in the event that too little of the chromate content has been incorporated therein. An actual change of composition of the mixture is indicated in the preparation by the change of color from orange to a greenish tint when the components aforesaid have properly reacted, after which the mixture is ready for use in impregnation as set forth. By this means, advantage is taken of the most efficient form for both the plating preparing solution and the impregnating operating solid and the result is greatly superior in durability to that obtainable from a single chemical mixture serving for both functions.

The finished condensers thus prepared can be canned in fibre cans, sealed and used as is customary in the art. Such condensers are able to operate at the highest temperatures usually met with in service in apparatus placed near heated apparatus parts and will withstand temperature conditions which are detrimental to other types of condensers. For low voltage service such condensers can be used singly or in parallel, but for high voltage service it is advisable to employ two or more condensers connected in series to minimize energy losses. Such condensers have found use in various electrical circuits and are generally applicable wherever small bulk, low cost, and high capacity are considerations as well as ability to operate satisfactorily when exposed to high operating temperatures. When a condenser of this kind has been used and is dissected for experiment, no sign of deterioration can be observed and the impregnated spacer sheets can be seen to possess a beautiful crystalline structure with a smooth glazed surface at both sides which have pressed against the aluminum positive and negative electrodes. Such condensers retain their operating properties when left standing idle and pass a very minimum of leakage current. They are polarized to direct current but readily pass alternating current or pulsating current. Small sizes of such condensers can be similarly prepared from stacked flat sheets in lieu of rolled winds as is customary in the art.

Some advantage results from feeding the aluminum sheet which is to be the positive electrode thru the preparing solution, as a more uniformly plated coat is thereby obtained. By arranging the feed rate with respect to the length of travel thru the preparing solution, the necessary time for a thorough dielectric film coating can be attained while maintaining as high a feed rate as six feet per minute corresponding to a total travel thru the treating solution of approximately four hundred feet of linear stock aluminum sheet under treatment continuously exposed to said treating solution.

In the operating solid, the function of the malic acid content is to impart a fine textured mass of interlocked crystals in said solid and to reinforce the dielectric coating on the positive electrode with a very thin layer of gas electrochemically decomposed from said malic acid during the use of the completed condenser. It is an observed fact that the capacity of the finished condenser tends to increase with use. Probably the organic compound formed in said operating solid includes some malates as a result of transient reactions of said malic acid with the other ingredients of said operating solid and the exact molecular combination in the completed operating solid is not at this time definitely known other than it is complex and probably undergoing transient changes under the influence of the electric current applied thereto during service of the completed condenser. Whatever transient chemical reactions occur they appear to be reversible or capable of forming other stable compounds because no detrimental action has been observed on such condensers after long service. This explanation of functions of ingredients is to be understood merely as a practical opinion based on observation rather than an attempt at an exact description of the complicated reactions, as such theory in no way minimizes the value of the invention.

It is not advisable to attempt to use the aforesaid operating solid mixture in the manner heretofore disclosed in this art, namely as a pouring mixture, because this operating solid mixture does not have good penetrating qualities except when used as herein set forth.

I have experimented with thin linen paper prepared from short fibre stock in lieu of the blotter paper and have obtained some good results in condensers of exceedingly small bulk, but very thin linen paper is difficult to handle in production as the spacing sheet, for mechanical reasons. The operating solid renders such thin linen paper transparent much the same as if same were impregnated with wax and such thin paper can be used if a slower rate of production is satisfactory. In such case it is essential to carefully guard against breaks in the thin linen paper to prevent short circuits in the finished condenser.

The invention comprises a new and very useful composition for electrical condensers of which a suitable embodiment has been described by way of example, and various changes may be made without departing from the essentials thereof within the scope of the appended claims. The operating quality sought for, namely ability to withstand high operating temperatures without loss of capacity or undesired increase of leakage current thru the dielectric has been attained in novel manner which is a distinct departure in this art.

This application is in part a continuation of my pending application S. No. 192,070 filed May 17, 1927. My condenser as herein set forth when dimensioned substantially as set forth in said application S. No. 192,070 will have piezo-electric properties approximately tuned to absorb sixty cycle frequency energy. This property arises from the interlocked crystal mass in the operating solid which is held against the electrodes in restraint by the container and greatly increases the filtering action of the condenser over and above that which may be had by a condenser of like electrical capacity but which is not so constructed to have proper piezo-electric absorption property. The absorbed energy taken by the condenser thru this piezo-electric effect also tends to rob the output current of ripples but does this without increasing its leakage to direct flowing current. While other condensers I have described have this piezo-electric property, the condenser herein set forth has the property to a marked degree because the operating solid retains its original solid form at the highest temperature at which the condenser may be operated and tends to transmit the mechanical vibrations in unison with the electrical strains applied via the electrodes.

I claim:

1. An electrical condenser composed of a positive and a negative electrode separated by an operating solid containing sodium phosphate, ammonium phosphate, ammonium dichromate and malic acid.

2. An electrical condenser composed of electrodes contacting with an operating solid consisting of ammonium salts mixed with an organic acid and a compound of chromium in order to minimize attack of said salts on said electrodes when said salts are heated.

3. An electrical condenser composed of positive and negative electrodes of a film-forming metal contacting with an operating solid electrolyte containing conducting chemicals to which is added a compound of chromium in amount proportioned to prevent attack of said chemicals on said electrodes when said electrodes are subjected to heat during use of said condenser.

4. An electrical condenser composed of positive and negative valve metal electrodes contacting with an operating solid electrolyte comprising current conducting chemicals including a proportioned amount of a chromate salt to stop attack of said chemicals on said electrodes.

5. An electrical condenser composed of aluminum electrodes contacting with an operating solid electrolyte comprising compounds of ammonium to which is added a reagent containing chromium in amount proportioned to minimize attack of said compound on said electrodes.

6. An electrical condenser composed of aluminum electrodes contacting with a substantially solid electrolyte comprising paper impregnated with a chemical mixture having the property of electrical conduction and containing a chromate salt proportioned to minimize the reaction of said mixture and said electrodes during the use of said condenser.

7. An electrical condenser composed of valve metal electrodes contacting with a fibrous sheet containing in substantially solid form chemicals having the property of electrical conduction and including a small proportion of chromium proportioned to minimize chemical reaction of said chemicals on said electrodes during the use of said condenser.

8. An electrical condenser composed of valve metal electrodes contacting with chemicals in substantially solid form held in a fibrous sheet permitting current to flow between said electrodes and containing a small portion of chromium to prevent destructive action of said chemicals on said electrodes during use of said condenser.

9. An electrical condenser composed of prepared positive aluminum electrodes and cooperating negative electrodes separated therefrom by a substantially solid conducting chemical mass containing combined chromium in amount proportioned to resist chemical action of said chemical mass on said electrodes during use of said condenser.

10. An electrical condenser composed of an aluminum prepared positive and of a cooperating negative electrode and a current conducting chemical mass contacting therewith, and a dichromate compound of chromium in said chemical mass in proportion predetermined to preserve said electrodes from attack of said chemical mass during use of said condenser.

11. An electrical condenser composed of aluminum electrodes separated by a contacting chemical mass in substantially solid form, one of said electrodes having a dielectric coating electrochemically prepared thereon, and a chromate compound in said chemical mass electronegative to said prepared aluminum electrode, in small amount proportioned to preserve the said dielectric coating during use of said condenser.

12. An electrical condenser composed of aluminum electrodes contacting with a chemical mass in substantially solid form one of said electrodes having a prepared dielectric coating thereon, and a small portion of a compound of chromium in said chemical mass to preserve said dielectric coating from destruction by said chemical mass during use of said condenser.

13. In electrolytic apparatus a filmed dielectric-surfaced electrode and a substantially solid cooperating electrolyte material therefor containing a small amount of chromium to prevent destructive chemical reaction between said electrode and said electrolyte material.

14. In electrolytic apparatus, a filmed dielectric-surface electrode and a substantially solid cooperating electrolyte material therefor containing current conducting and film forming chemicals to which is added a small portion of combined chromium sufficient to stop destructive reaction of said chemicals on said electrode.

15. An electrical condenser composed of filming metal electrodes separated by an operating solid containing phosphate salts and a dichromate salt.

16. In apparatus of the class described, two electrodes, one of which is prepared from a filming metal and treated in a preparing solution to place a film thereon, and both are operated in a chemically different substantially solid operating mixture including a chromate content proportioned to preserve said film.

17. In apparatus of the class described, two electrodes, one of which is prepared from aluminum and electrically treated in a preparing chemical to place a film thereon, and both are operated in a chemically different substantially solid operating mixture containing a sufficient amount of chromium in the form of a chromate to preserve said film.

In witness whereof, I have hereunto set my hand this 18th day of November, 1927.

PHILIP E. EDELMAN.